(12) United States Patent
Dry

(10) Patent No.: US 6,475,264 B1
(45) Date of Patent: Nov. 5, 2002

(54) DIRECT SMELTING PROCESS

(75) Inventor: Rodney James Dry, City Beach (AU)

(73) Assignee: Technological Resources Pty Ltd, Melbourne (AT)

( * ) Notice: Subject to any disclaimer, the term of this patent is extended or adjusted under 35 U.S.C. 154(b) by 0 days.

(21) Appl. No.: 09/509,290

(22) PCT Filed: Jul. 26, 1999

(86) PCT No.: PCT/AU99/00600

§ 371 (c)(1), (2), (4) Date: Mar. 21, 2000

(87) PCT Pub. No.: WO00/06783

PCT Pub. Date: Feb. 10, 2000

(30) Foreign Application Priority Data

Jul. 24, 1998 (AU) .............................................. PP4839
Aug. 21, 1998 (AU) .............................................. PP5406

(51) Int. Cl.$^7$ .............................................. C21B 13/14
(52) U.S. Cl. .............................. 75/446; 75/504; 75/505; 75/516; 75/958
(58) Field of Search ........................ 75/707, 958, 504, 75/505, 516, 446

(56) References Cited

U.S. PATENT DOCUMENTS

| | | |
|---|---|---|
| 2,647,045 A | 7/1953 | Rummel |
| 3,844,770 A | 10/1974 | Nixon |
| 3,845,190 A | 10/1974 | Yosim et al. |
| 3,888,194 A | 6/1975 | Kishigami et al. |
| 3,890,908 A | 6/1975 | von Klenck et al. |
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zangs |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |

(List continued on next page.)

OTHER PUBLICATIONS

Patent Abstract of Japan, JP, A, 10–280020 (Nippon Steel Corp.), Oct. 20, 1998.

(List continued on next page.)

Primary Examiner—Roy King
Assistant Examiner—Tima McGuthry-Banks
(74) Attorney, Agent, or Firm—Merchant & Gould, P.C.

(57) ABSTRACT

A process for direct smelting a metalliferous feed material is disclosed. The process includes the steps of partially reducing metalliferous feed material and substantially devolatilising coal in a pre-reduction vessel and producing a partially reduced metalliferous feed material and char. The process also includes direct smelting the partially reduced metalliferous feed material to molten metal in a direct smelting vessel using the char as a source of energy and as a reductant and post-combusting reaction gas produced in the direct smelting process with pre-heated air or oxygen-enriched air to a post-combustion level of greater than 70% to generate heat required for the direct smelting reactions and to maintain the metal in a molten state.

20 Claims, 2 Drawing Sheets

U.S. PATENT DOCUMENTS

| | | | |
|---|---|---|---|
| 4,209,322 A | * | 6/1980 | Janssen et al. ................ 75/479 |
| 4,356,035 A | | 10/1982 | Brotzmann et al. |
| 4,389,043 A | | 6/1983 | Weber et al. |
| 4,400,936 A | | 8/1983 | Evans |
| 4,402,274 A | | 9/1983 | Meenan et al. |
| 4,431,612 A | | 2/1984 | Bell et al. |
| 4,447,262 A | | 5/1984 | Gay et al. |
| 4,455,017 A | | 6/1984 | Wunsche |
| 4,468,298 A | | 8/1984 | Byrne et al. |
| 4,468,299 A | | 8/1984 | Byrne et al. |
| 4,468,300 A | | 8/1984 | Byrne et al. |
| 4,481,891 A | | 11/1984 | Takeshita et al. |
| 4,504,043 A | | 3/1985 | Yamaoka et al. |
| 4,511,396 A | | 4/1985 | Nixon |
| 4,565,574 A | | 1/1986 | Katayama et al. |
| 4,566,904 A | | 1/1986 | von Bogdandy et al. |
| 4,572,482 A | | 2/1986 | Bedell |
| 4,574,714 A | | 3/1986 | Bach et al. |
| 4,602,574 A | | 7/1986 | Bach et al. |
| 4,664,618 A | | 5/1987 | Gitman |
| 4,681,599 A | | 7/1987 | Obkircher |
| 4,684,448 A | | 8/1987 | Itoh et al. |
| 4,701,214 A | | 10/1987 | Kaneko et al. |
| 4,718,643 A | | 1/1988 | Gitman |
| 4,786,321 A | | 11/1988 | Hoster et al. |
| 4,790,516 A | | 12/1988 | Sugiura et al. |
| 4,798,624 A | | 1/1989 | Brotzmann et al. |
| 4,849,015 A | | 7/1989 | Fassbinder et al. |
| 4,861,368 A | | 8/1989 | Brotzmann et al. |
| 4,874,427 A | | 10/1989 | Hamada et al. |
| 4,890,562 A | | 1/1990 | Gitman |
| 4,913,734 A | | 4/1990 | Romenets et al. |
| 4,923,391 A | | 5/1990 | Gitman |
| 4,940,488 A | | 7/1990 | Maeda et al. |
| 4,946,498 A | | 8/1990 | Weber |
| RE33,464 E | | 11/1990 | Gitman |
| 4,976,776 A | | 12/1990 | Elvander et al. |
| 4,999,097 A | | 3/1991 | Sadoway |
| 5,005,493 A | | 4/1991 | Gitman |
| 5,024,737 A | | 6/1991 | Claus et al. |
| 5,037,608 A | | 8/1991 | Tarcy et al. |
| 5,042,964 A | | 8/1991 | Gitman |
| 5,050,848 A | | 9/1991 | Hardie et al. |
| 5,051,127 A | | 9/1991 | Hardie et al. |
| 5,065,985 A | | 11/1991 | Takahashi et al. |
| 5,177,304 A | | 1/1993 | Nagel |
| 5,191,154 A | | 3/1993 | Nagel |
| 5,222,448 A | | 6/1993 | Morgenthaler et al. |
| 5,238,646 A | | 8/1993 | Tarcy et al. |
| 5,271,341 A | | 12/1993 | Wagner |
| 5,279,715 A | | 1/1994 | La Camera et al. |
| 5,301,620 A | | 4/1994 | Nagel et al. |
| 5,302,184 A | | 4/1994 | Batterham et al. |
| 5,322,547 A | | 6/1994 | Nagel et al. |
| 5,332,199 A | | 7/1994 | Knapp et al. |
| 5,333,558 A | | 8/1994 | Lees, Jr. |
| 5,396,850 A | | 3/1995 | Conochie et al. |
| 5,401,295 A | | 3/1995 | Brotzmann |
| 5,407,461 A | | 4/1995 | Hardie et al. |
| 5,415,742 A | | 5/1995 | La Camera et al. |
| 5,443,572 A | | 8/1995 | Wilkison et al. |
| 5,480,473 A | | 1/1996 | Hardie et al. |
| 5,489,325 A | | 2/1996 | Keogh et al. |
| 5,498,277 A | | 3/1996 | Floyd et al. |
| 5,518,523 A | | 5/1996 | Brotzmann |
| 5,529,599 A | | 6/1996 | Calderon |
| 5,613,997 A | | 3/1997 | Satchell, Jr. |
| 5,640,708 A | | 6/1997 | Conochie et al. |
| 5,647,888 A | | 7/1997 | Keogh et al. |
| 5,741,349 A | | 4/1998 | Hubble et al. |
| 5,800,592 A | | 9/1998 | den Hartog et al. |
| 5,802,097 A | | 9/1998 | Gensini et al. |
| 5,938,815 A | | 8/1999 | Satchell, Jr. |

FOREIGN PATENT DOCUMENTS

| | | |
|---|---|---|
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |

OTHER PUBLICATIONS

Patent Abstracts of Japan, C–951, p. 24, JP, A, 04–63218 (Kawasaki Heavy Ind. Ltd), Feb. 28, 1992.

Patent Abstracts of Japan, C–627, p. 109, Jp, A, 01–127613 (Kawasaki Steel Corp.), May 19, 1989.

WPAT print–out for Brazilian patent application PI9400123–5 (Weber), No month, 1995.

Patent Abstracts of Japan, C–951, JP, A, 4–63217 (Kawasaki Heavy Ind. Ltd.), Feb. 28, 1992.

Patent abstracts of Japan, C–497, p. 115, JP, A, 62–280315 (Nippon Kokan K.K), Dec. 15, 1987.

Derwent Abstract Accession No. 87–039748/06, JP, A, 61–295334, Dec. 26, 1986.

* cited by examiner

DIRECT SMELTING PROCESS

The present invention relates to a process for producing molten metal (which term includes metal alloys), in particular although by no means exclusively iron, from a metalliferous feed material, such as ores, partly reduced ores and metal-containing waste streams, in a metallurgical vessel containing a molten bath.

The present invention relates particularly to a molten metal bath-based direct smelting process for producing molten metal from a metalliferous feed material.

A process that produces molten metal directly from a metalliferous feed material is generally referred to as a "direct smelting process".

One known direct smelting process, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen-enriched air or oxygen into the slag via a lower row of tuyeres to provide slag agitation and injection of oxygen into the slag via an upper row of tuyeres to promote post-combustion. In the Romelt process the metal layer is not an important reaction medium.

Another known group of direct smelting processes that is slag-based is generally described as "deep slag" processes. These processes, such as DIOS and AISI processes, are based on forming a deep layer of slag with 3 regions, namely: an upper region for post-combusting reaction gases with injected oxygen; a lower region for smelting metal oxides to metal; and an intermediate region which separates the upper and lower regions. As with the Romelt process, the metal layer below the slag layer is not an important reaction medium.

Another known direct smelting process, which relies on a molten metal layer as a reaction medium and is generally referred to as the HIsmelt process, is described in International application PCT/AU96/00197 (WO 96/31627) in the name of the applicant.

The HIsmelt process as described in the International application comprises:
(a) forming a molten bath having a metal layer and a slag layer on the metal layer in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting the metalliferous feed material to metal in the metal layer.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed material.

The HIsmelt process also comprises forming a transition zone above the nominal quiescent surface of the bath in which there are ascending and thereafter descending droplets or splashes or streams of molten metal and/or slag which provide an effective medium to transfer to the bath the thermal energy generated by post-combusting reaction gases above the bath.

An object of the present invention is to provide an improved direct smelting process.

According to the present invention there is provided a process for direct smelting a metalliferous feed material which includes the steps of:
(a) supplying metalliferous feed material and coal to a pre-reduction vessel;
(b) partially reducing metalliferous feed material and substantially devolatilising coal in the pre-reduction vessel and producing a partially reduced metalliferous feed material and char;
(c) supplying the partially reduced metalliferous feed material and char produced in step (b) to a direct smelting vessel;
(d) supplying pre-heated air or oxygen-enriched air to the direct smelting vessel; and
(e) direct smelting the partially reduced metalliferous feed material to molten metal in the direct smelting vessel using the char as a source of energy and as a reductant and post-combusting reaction gas produced in the direct smelting process with the pre-heated air or oxygen-enriched air to a post-combustion level of greater than 70% to generate heat required for the direct smelting reactions and to maintain the metal in a molten state.

The process is particularly, although by no means exclusively, relevant to medium and high volatile coals. Medium volatile coals are understood herein to mean coals containing 20–30 wt % volatiles. High volatile coals are understood herein to mean coals containing in excess of 30 wt % volatiles.

In the case of medium and high volatile coals, the basis of the present invention is the realisation that substantial devolatilisation of these coal types prior to introducing the coal into a direct smelting vessel makes it possible to operate economically a direct smelting process at post-combustion levels of 70% or more using heated air or oxygen-enriched air as the oxygen-containing gas for post-combustion.

Preferably step (b) produces partially reduced metalliferous feed material having a pre-reduction degree of less than 65%.

Preferably, the oxygen concentration in the oxygen-enriched air is less than 50 vol. percent.

The term "substantially devolatilising" means removal of at least 70 wt. percent of the volatiles from coal.

The term "post-combustion" is defined as:

$$\frac{[CO_2] + [H_2O]}{[CO_2] + [H_2O] + [CO] + [H_2]}$$

where:
[$CO_2$]=volume % of $CO_2$ in off-gas;
[$H_2O$]=volume % of $H_2O$ in off-gas;
[CO]=volume % of CO in off-gas; and
[$H_2$]=volume % of $H_2$ in off-gas.

The term "off-gas" is defined herein as gas generated by smelting reactions and post-combustion and prior to optional addition of any further carbonaceous feed material such as natural gas into that gas.

Preferably the process includes pre-heating air or oxygen-enriched air for step (d) to a temperature in the range of 800–1400° C. and thereafter supplying the pre-heated air or oxygen-enriched air to the direct smelting vessel in step (d).

More preferably the temperature is in the range of 1000–1250° C.

Preferably the process includes using off-gas discharged from the direct smelting vessel as a source of energy for pre-heating air or oxygen-enriched air prior to supplying the heated air or oxygen-enriched air to the direct smelting vessel in step (d).

Preferably the process includes cooling the off-gas discharged from the direct smelting vessel prior to using the off-gas as the energy source.

Preferably the process includes using part of the off-gas discharged from the pre-reduction vessel as a source of energy for pre-heating air or oxygen-enriched air prior to supplying the heated air or oxygen-enriched air to the direct smelting vessel in step (d).

Preferably the process includes pre-heating the air or oxygen-enriched air in one or more than one hot blast stove.

Preferably the process includes pre-heating the metalliferous feed material prior to step (a) of supplying the metalliferous feed material to the pre-reduction vessel.

Preferably the process includes pre-heating the metalliferous feed material using off-gas discharged from the pre-reduction vessel.

Preferably the pre-reduction vessel is a fluidised bed.

More preferably the process includes recycling off-gas discharged from the fluidised bed back to the fluidised bed.

Preferably the process includes recycling at least 70% by volume of the off-gas discharged from the fluidised bed back to the fluidised bed.

The term "fluidised bed" is understood herein to include both bubbling and circulating types. Combination bubbling and circulating are also included.

The term "metalliferous feed material" is understood herein to mean any metalliferous feed material, which includes metal oxides, such as ores, partly reduced ores and metal-containing waste streams.

Step (e) may be any suitable direct smelting process.

Preferably step (e) includes direct smelting the partially reduced metalliferous feed material in accordance with the HIsmelt process which includes:

(a) forming a molten bath having a metal layer and a slag layer on the metal layer in the direct smelting vessel;

(b) injecting the metalliferous feed material and the char into the metal layer via a plurality of lances/tuyeres;

(c) smelting the metalliferous feed material to molten metal substantially in the metal layer;

(d) causing molten metal and slag to be projected as splashes, droplets, and streams into a space above a nominal quiescent surface of the molten bath and forming a transition zone; and (e) injecting the pre-heated air or oxygen-enriched air into the direct smelting vessel via one or more than one lance/tuyere and post-combusting reaction gases released from the molten bath, whereby the ascending and thereafter descending splashes, droplets, and streams of molten metal and slag in the transition zone facilitate heat transfer to the molten bath, and whereby the transition zone minimises heat loss from the vessel via the side wall in contact with the transition zone.

The term "metal layer" is understood herein to mean a region or zone that is predominantly metal. Specifically, the term covers a region or zone that includes a dispersion of molten slag in a metal continuous volume.

The term "quiescent surface" in the context of the molten bath is understood herein to mean the surface of the molten bath under process conditions in which there is no gas/solids injection and therefore no bath agitation.

BRIEF DESCRIPTION OF THE DRAWINGS

The present invention is described further by way of example with reference to the accompanying drawings, of which.

Figure 1:
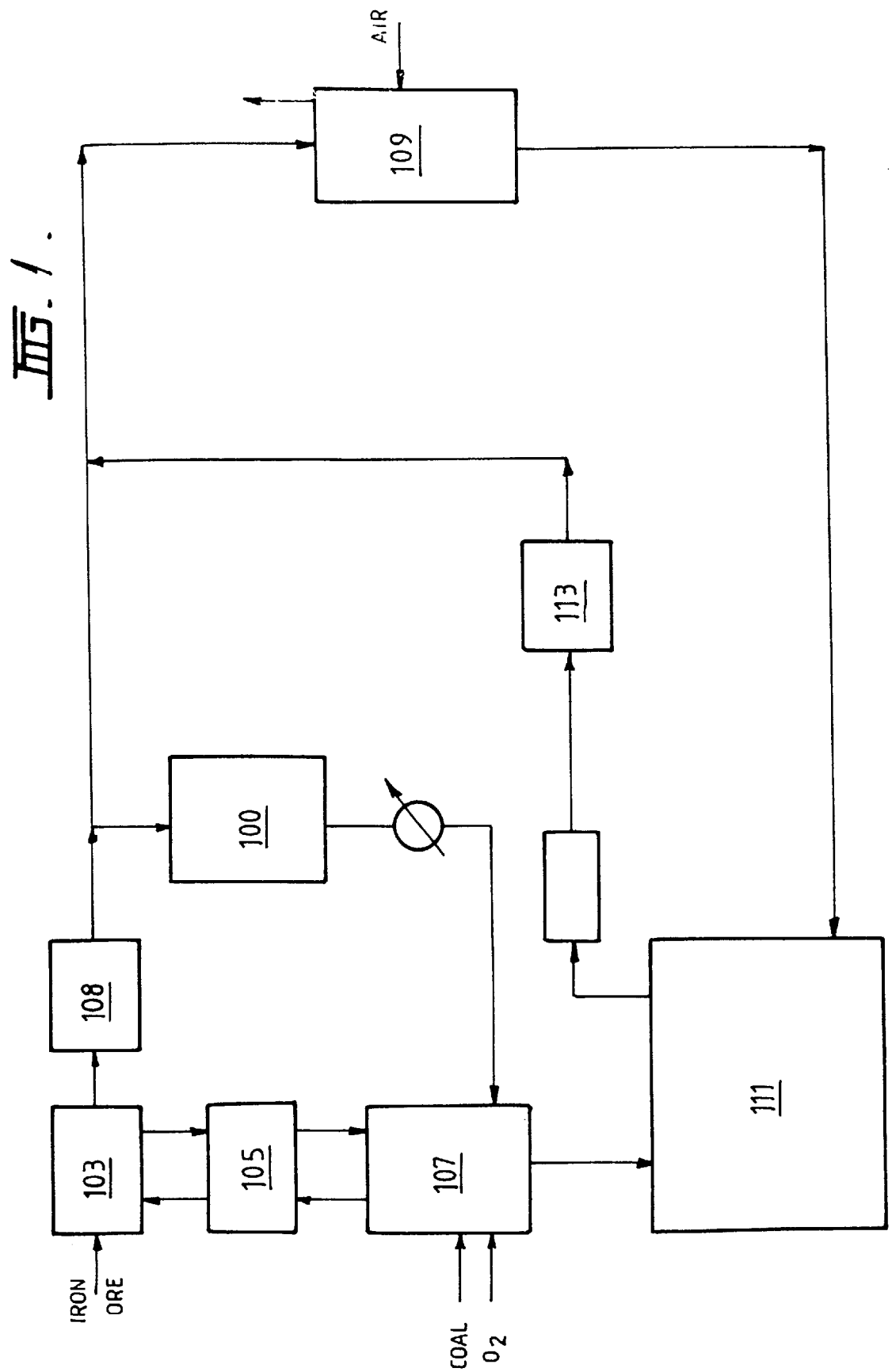
FIG. 1 is a flow sheet, in largely schematic form, of the process of the present invention.

The description of the preferred embodiment shown in FIG. 1 is in the context of producing iron from iron ore. However, it is noted that the preferred embodiment is equally applicable to producing metals (including metal alloys) from other metalliferous feed material.

With reference to FIG. 1, iron ore is pre-heated in pre-heat cyclones 103,105 to a temperature of the order of 750° C. and is transferred to a fluid bed reactor 107 which operates at a temperature of the order of 800–1000° C. Coal (typically, medium and/or high volatile coal), oxygen, and a reducing gas which includes high levels of CO and $H_2$ are also supplied to the reactor 107. The pre-heated iron ore is partially reduced in the reactor 107 to a pre-reduction degree that preferably is less than 65% and the coal is substantially devolatilised and forms char. The term "pre-reduction degree" in this context means the percentage of oxygen removed assuming a starting point of Fe2O3 and assuming Fe is 100% pre-reduction.

The off-gas discharged from the reactor 107 is transferred through the pre-heat cyclones 103,105 and pre-heats the iron ore supplied to these cyclones. The off-gas is then cooled in a venturi scrubber 108. The cooled off-gas is split into two streams. One stream, which is at least 70% of the total volume of off-gas, is supplied to a $CO_2$ scrubber 110, reheated and then returned as the reducing fluidising gas to the reactor 107. The other stream is supplied to hot blast stoves 109 and used as combustion gas which heats the stoves.

The partially reduced iron ore and char from the reactor 107, which are typically at temperatures of the order of 600–900° C., and air pre-heated to a temperature of the order of 1200° C. from the stoves 109 are supplied to a direct smelting vessel 111.

The partially reduced iron ore is smelted to molten iron in the vessel 111 and reaction gases, such as CO and H2 produced in smelting the pre-reduced iron ore are post-combusted to a post-combustion level of at least 70%. The heat generated by post-combustion is used to maintain temperatures within the vessel 111.

A portion of the off-gas discharged from the vessel 111 is transferred via a venturi scrubber 113 to the stoves 109 and is used as a combustion gas which contributes to heating the stoves 109.

The direct smelting process operating in the direct smelting vessel 111 may be any suitable process.

The preferred direct smelting process is the HIsmelt process as described in general terms hereinafter with reference to FIG. 2 and in more detail in International application PCT/AU99/00538 in the name of the applicant. The disclosure in the patent specification lodged with the International application is incorporated herein by cross-reference.

The preferred direct smelting process is based on:

(a) forming a molten bath having a metal layer and a slag layer on the metal layer in the direct smelting vessel 111;

(b) injecting the partially reduced iron ore and the char (and optionally other carbonaceous material, such as additional coal) into the metal layer via one or more than one lance/tuyere;

(c) smelting the partially reduced iron ore to molten iron substantially in the metal layer;

(d) causing molten material to be projected as splashes, droplets, and streams into a space above a normal quiescent surface of the molten bath and forming a transition zone; and (e) injecting the pre-heated air or oxygen-enriched air into the direct smelting vessel 111 via one or more than one lance/tuyere and post-combusting reaction gases released from the molten bath to a post-combustion level of greater than 70% and generating gas phase temperatures of the order of 2000° C. or higher in the transition zone, whereby the ascending and thereafter descending splashes, droplets and streams of molten metal and slag in the transition zone facilitate heat transfer to the molten bath, and whereby the transition zone minimises heat loss from the vessel via the side walls in contact with the transition zone.

The direct smelting vessel 111 may be any suitable vessel.

The preferred direct smelting vessel is the vessel described in general terms hereinafter with reference to FIG. 2 and in more detail in International application PCT/AU99/00537 in the name of the applicant and the disclosure in the patent specification lodged with the International application is incorporated herein by cross-reference.

Figure 2:
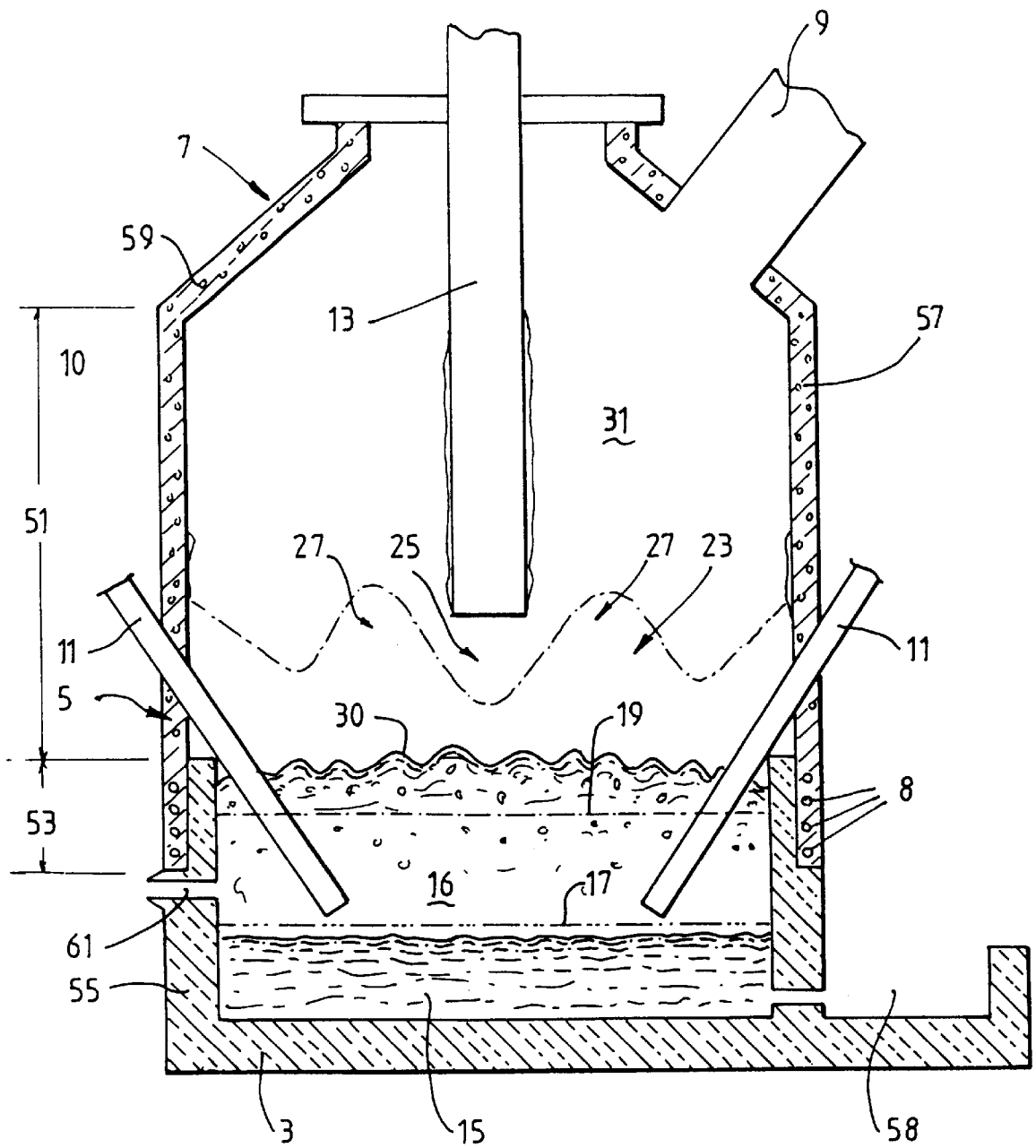
FIG. 2 is a vertical section through a preferred form of a direct smelting vessel for use in the process shown in FIG. 1.

The vessel 111 shown in FIG. 2 has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 57 for discharging molten metal continuously; a forehearth connection 71 that interconnects the hearth and the forehearth 57; and a tap-hole 61 for discharging molten slag.

In use, under steady-state process conditions, the vessel 111 contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solids into the vessel.

The vessel 111 also includes 2 solids injection lances/tuyeres 11 extending downwardly and inwardly at an angle of 30–60° to the vertical through the side walls 5 and into the slag layer 16. The position of the lances/tuyeres 11 is selected so that the lower ends are above the quiescent surface 17 of the metal layer 15 under steady-state process conditions.

In use, under steady-state process conditions the partially reduced iron ore and the char from the reactor 107 (and optionally other carbonaceous material, such as coal), and fluxes (typically lime and magnesia) entrained in a carrier gas (typically $N_2$) are injected into the metal layer 15 via the lances/tuyeres 11. The momentum of the solid material/carrier gas causes the solid material and gas to penetrate the metal layer 15. Carbon partially dissolves into the metal and partially remains as solid carbon. The iron ore is smelted to metal and the smelting reaction generates carbon monoxide gas. The gases transported into the metal layer 15 and generated via smelting produce significant buoyancy uplift of molten metal, solid carbon, and slag (drawn into the metal layer 15 as a consequence of solid/gas/injection) from the metal layer 15 which generates an upward movement of splashes, droplets and streams of molten metal and slag, and these splashes, and droplets, and streams entrain slag as they move through the slag layer 16.

The buoyancy uplift of molten metal, solid carbon and slag causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of no more than 30° in each region.

In addition, the upward movement of splashes, droplets and streams of molten metal and slag caused by the buoyancy uplift of molten metal, solid carbon, and slag extends into the top space 31 above the molten material in the vessel and:

(a) forms a transition zone 23; and (b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel Ill further includes a lance 13 for injecting the pre-heated air or oxygen-enriched air from the stoves 9 into the vessel 111. The lance 13 is centrally located and extends vertically downwardly into the vessel. The position of the lance 13 and the gas flow rate through the lance 13 are selected so that under steady-state process conditions the oxygen-containing gas penetrates the central region of the transition zone 23 and maintains an essentially metal/slag free space 25 around the end of the lance 13.

In use, under steady-state process conditions, the injection of the oxygen-containing gas via the lance 13 post-combusts reaction gases CO and $H_2$ to a post-combustion level of greater than 70% in the transition zone 23 and in the free space 25 around the end of the lance 13 and generates high gas phase temperatures of the order of 2000° C. or higher in the gas space. The heat is transferred to the ascending and descending splashes droplets, and streams, of molten material in the region of gas injection and the heat is then partially transferred to the metal layer 15 when the metal/slag returns to the metal layer 15.

The free space 25 is important to achieving high levels of post combustion because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten metal and slag is to shape the transition zone 23 around the lower region of the lance 13—generally identified by the numerals 27. This shaped region provides a partial barrier to heat transfer by radiation to the side walls 5.

Moreover, under steady-state process conditions, the ascending and descending droplets, splashes and streams of metal and slag is an effective means of transferring heat from the transition zone 23 to the molten bath with the result that the temperature of the transition zone 23 in the region of the side walls 5 is of the order of 1450° C.–1550° C.

The vessel 111 is constructed with reference to the levels of the metal layer 15, the slag layer 16, and the transition zone 23 in the vessel 111 when the process is operating under steady-state process conditions and with reference to splashes, droplets and streams of molten metal and slag that are projected into the top space 31 above the transition zone 23 when the process is operating under steady-state operating conditions, so that:

(a) the hearth and the lower barrel section 53 of the side walls 5 that contact the metal/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 58, 59.

Each water cooled panel 8, 58, 59 (not shown) in the upper barrel section 51 of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent horizontal sections of each pipe and between the pipes. Each panel further includes a support plate which forms an outer surface of the panel.

The water inlets and the water outlets of the pipes are connected to a water supply circuit (not shown) which circulates water at high flow rate through the pipes.

Many modifications may be made to the preferred embodiment described above without departing from the spirit and scope of the present invention.

What is claimed is:

1. A process for direct smelting a metalliferous feed material comprising:

(a) supplying metalliferous feed material and coal to a fluidized bed;

(b) partially reducing metalliferous feed material and substantially devolatilizing coal in the fluidized bed and producing a partially reduced metalliferous feed material and char;

(c) supplying the partially reduced metalliferous feed material and char produced in step (b) to a direct smelting vessel;

(d) using off-gas discharged from the fluidized bed as a source of energy and pre-heating air or oxygen-enriched air and thereafter supplying the pre-heated air or oxygen-enriched air to the direct smelting vessel; and (e) direct smelting the partially reduced metalliferous feed material to molten metal in the direct smelting vessel using the char as a source of energy and as a reductant and post-combusting reaction gas produced in the direct smelting process with the pre-heated air or oxygen-enriched air to a post-combustion level of greater than 70% to generate heat required for the direct smelting reactions and to maintain the metal in a molten state.

2. The process defined in claim 1 wherein the oxygen concentration in the oxygen-enriched air is less than 50 vol. percent.

3. The process defined in claim 1 including pre-heating air or oxygen-enriched air for step (d) to a temperature in the range of 800–1400° C. and thereafter supplying the pre-heated air or oxygen-enriched air to the direct smelting vessel in step (d).

4. The process defined in claim 3 wherein the temperature is in the range of 1000–1250° C.

5. The process defined in claim 3 including using off-gas discharged from the direct smelting vessel as a source of energy for pre-heating air or oxygen-enriched air prior to supplying the heated air or oxygen-enriched air to the direct smelting vessel in step (d).

6. The process defined in claim 3 including pre-heating the air or oxygen-enriched air in one or more than one hot blast stove.

7. The process defined in claim 1 including recycling at least part of the off-gas discharged from the fluidized bed back to the fluidized bed.

8. The process defined in claim 7 including recycling at least 70% by volume of the off-gas discharged from the fluidized bed back to the fluidized bed.

9. The process defined claim 1 wherein step (e) includes:

(i) forming a molten bath having a metal layer and a slag layer on the metal layer in the direct smelting vessel;

(ii) injecting the metalliferous feed material and the char into the metal layer via a plurality of lances/tuyeres;

(iii) smelting the metalliferous feed material to molten metal substantially in the metal layer;

(iv) causing molten metal and slag to be projected as splashes, droplets, and streams into a space above a nominal quiescent surface of the molten bath and forming a transition zone; and (v) injecting the pre-heated air or oxygen-enriched air into the direct smelting vessel via one or more than one lance/tuyere and post-combusting reaction gases released from the molten bath, whereby the ascending and thereafter descending splashes, droplets, and streams of molten metal and slag in the transition zone facilitate heat transfer to the molten bath, and whereby the transition zone minimizes heat loss from the vessel via a side wall in contact with the transition zone.

10. The process defined in claim 1 further including injecting coal into the direct smelting vessel, whereby the coal acts as a source of energy and as a reductant in the vessel.

11. A process for direct smelting a metalliferous feed material comprising:

(a) supplying metalliferous feed material and medium or high volatile coal to pre-reduction vessel comprising a fluidized bed;

(b) partially reducing metalliferous feed material and substantially devolatilizing coal in the pre-reduction vessel and producing a partially reduced metalliferous feed material and char;

(c) supplying the partially reduced metalliferous feed material and char produced in step (b) to a direct smelting vessel;

(d) using off-gas discharged from the pre-reduction vessel as a source of energy and pre-heating air or oxygen-enriched air and thereafter supplying the pre-heated air or oxygen-enriched air to the direct smelting vessel; and (e) direct smelting the partially reduced metalliferous feed material to molten metal in the direct smelting vessel using the char as a source of energy and as a reductant and post-combusting reaction gas produced in the direct smelting process with the pre-heated air or oxygen-enriched air to a post-combustion level of greater than 70% to generate heat required for the direct smelting reactions and to maintain the metal in a molten state.

12. The process as claimed in claim 11, wherein the oxygen concentration in the oxygen-enriched air is less than 50 vol. percent.

13. The process as claimed in claim 11 including pre-heating air or oxygen-enriched air for step (d) to a temperature in the range of 800–1400° C. and thereafter supplying the pre-heated air or oxygen-enriched air to the direct smelting vessel in step (d).

14. The process as claimed in claim 13 wherein the temperature is in the range of 1000–1250° C.

15. The process as claimed in claim 11 including using off-gas discharged from the direct smelting vessel as a source of energy for pre-heating air or oxygen-enriched air prior to supplying the heated air or oxygen-enriched air to the direct smelting vessel in step (d).

16. The process as claimed in claim 13 including pre-heating the air or oxygen-enriched air in one or more than one hot blast stove.

17. The process as claimed in claim 11 including recycling at least part of the gas discharged from the fluidized bed back to the fluidized bed.

18. The process defined in claim 17 including recycling at least 70% by volume of the off-gas discharged from the fluidized bed back to the fluidized bed.

19. The process defined in claim 11 wherein step (e) includes:
   (i) forming a molten bath having a metal layer and a slag layer on the metal layer in the direct smelting vessel;
   (ii) injecting the metalliferous feed material and the char into the metal layer via a plurality of lances/tuyeres;
   (iii) smelting the metalliferous feed material to molten metal substantially in the metal layer;
   (iv) causing molten metal and slag to be projected as splashes, droplets, and streams into a space above a nominal quiescent surface of the molten bath and forming a transition zone; and
   (v) injecting the pre-heated air or oxygen-enriched air into the direct smelting vessel via one or more than one lance/tuyere and post-combusting reaction gases released from the molten bath, whereby the ascending and thereafter descending splashes, droplets, and streams of molten metal and slag in the transition zone facilitate heat transfer to the molten bath, and whereby the transition zone minimizes heat loss from the vessel via the side wall in contact with the transition zone.

20. The process defined in claim 11 further including injecting coal into the direct smelting vessel, whereby the coal acts as a source of energy and as a reductant in the vessel.

* * * * *